June 23, 1953  D. N. GOLDBERG  2,642,760
DRILL PRESS ATTACHMENT
Filed Dec. 29, 1950  2 Sheets-Sheet 1
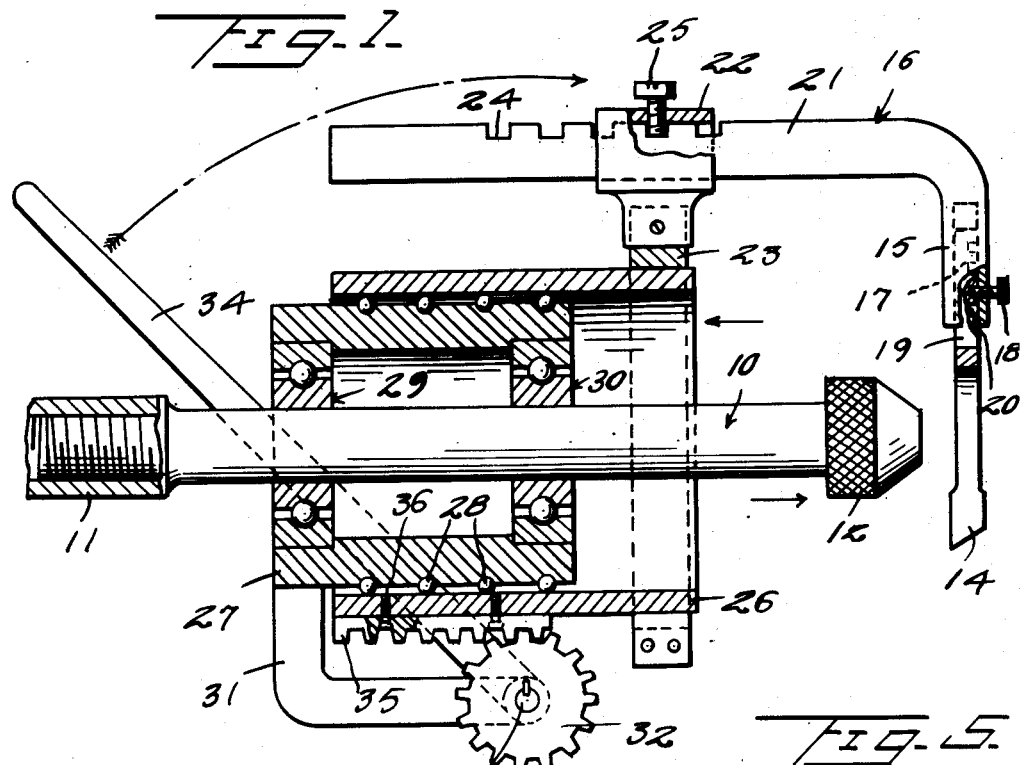
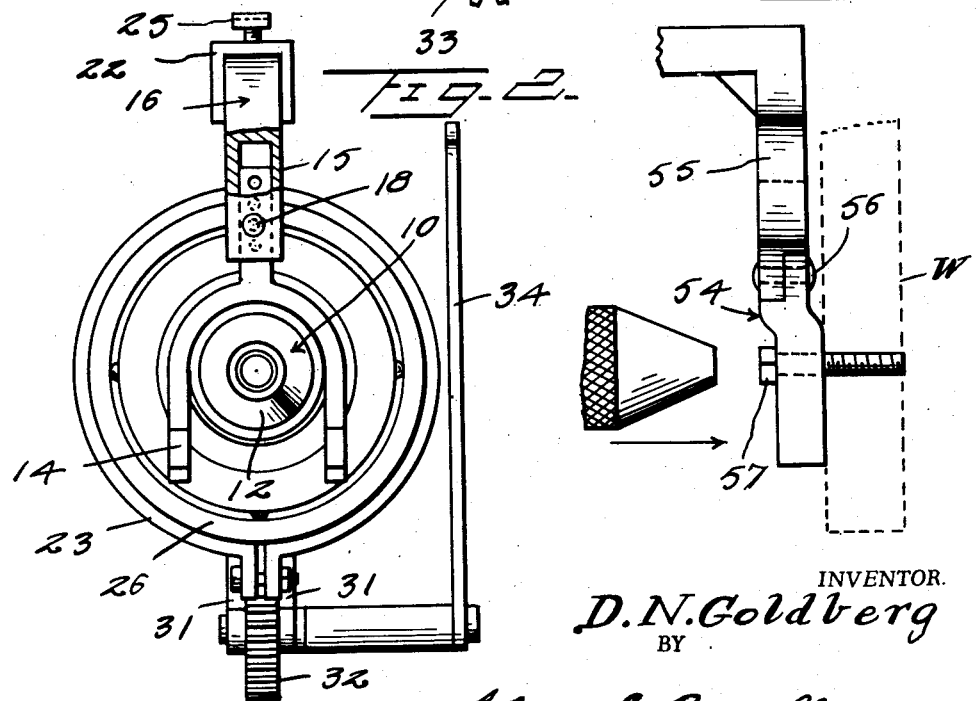
INVENTOR.
D. N. Goldberg
BY
Kimmel & Crowell ATTORNEYS

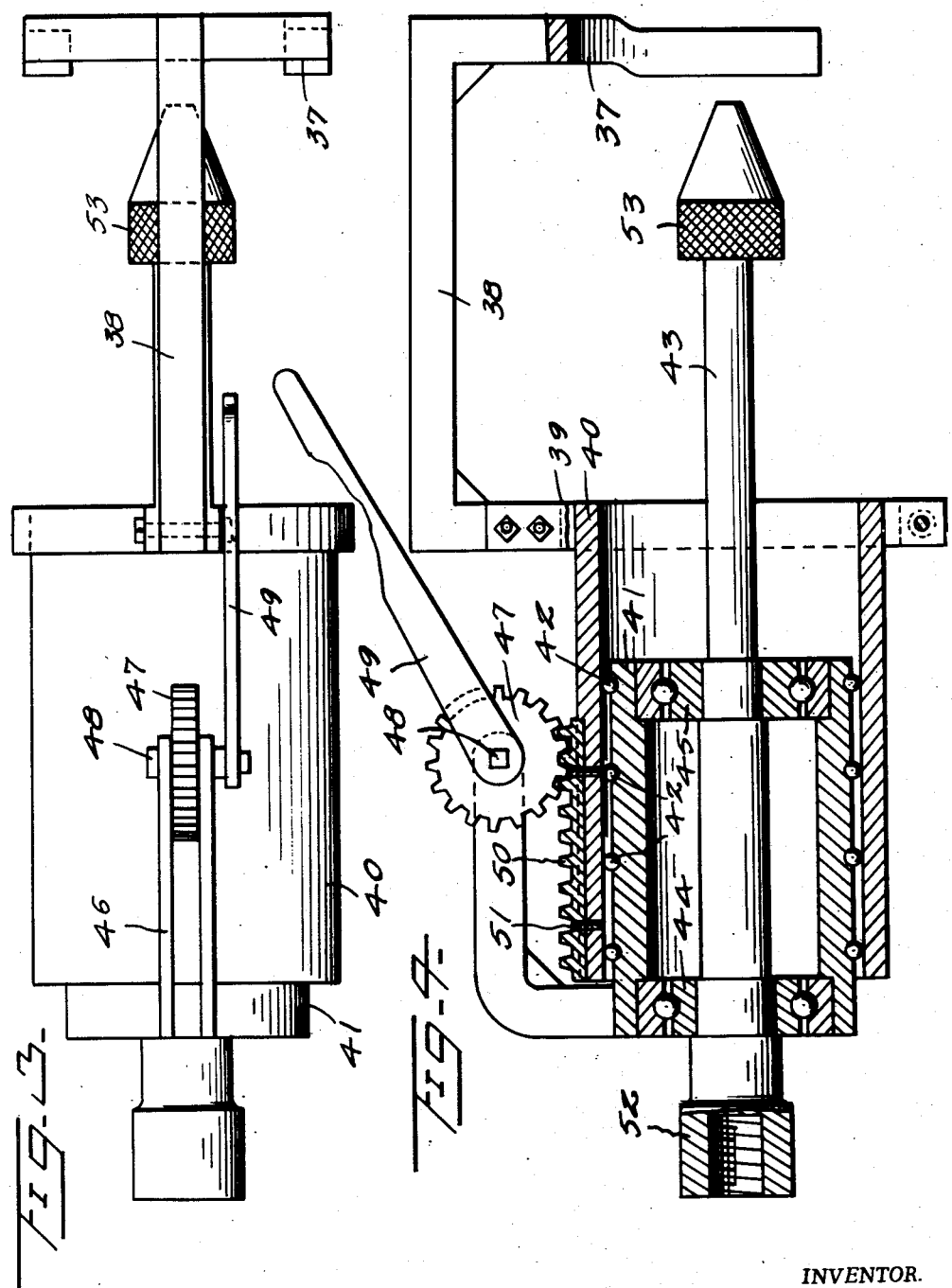

Patented June 23, 1953

2,642,760

UNITED STATES PATENT OFFICE 2,642,760

DRILL PRESS ATTACHMENT

David N. Goldberg, Wheeling, W. Va.

Application December 29, 1950, Serial No. 203,504

2 Claims. (Cl. 77—7)

This invention relates to an attachment for hand operated or electric drills.

An object of this invention is to provide a press attachment for manual or electric drills, by means of which pressure may be applied to the drill and work piece to effect the desired rapid drilling.

Another object of this invention is to provide an attachment of this kind which will eliminate shifting the work to a stationary drill press and which will permit drilling either horizontal, vertical or angular holes.

A further object of this invention is to provide an attachment of this kind by means of which an even pressure may be applied to the drill for effecting the drilling operation in a minimum of time and with minimum of breakage to the drill bits.

With the above and other objects in view, my invention consists in the arrangement, combination and details of construction disclosed in the drawing and specification, and then more particularly pointed out in the appended claims.

In the drawing,

Figure 1 is a longitudinal section of a drill press attachment constructed according to an embodiment of this invention, Figure 2 is a detail front elevation, partly broken away and in section, of the device, Figure 3 is a plan view of a modified form of this invention, Figure 4 is a longitudinal section of the attachment shown in Figure 3, Figure 5 is a fragmentary side elevation of another modification of this invention.

Referring to the drawings and first to Figures 1 and 2, the numeral 10 designates generally a spindle which is formed at one end thereof with a threaded bushing 11 for engagement with the threaded forward end of a spindle carried by a hand or electric drill. The spindle 10 is provided at its forward end with a chuck 12 of conventional construction, which is adapted to receive a drill or the like.

In order to provide a means whereby a work piece which is being drilled may be moved toward the drill carried by the chuck 12, under a predetermined pressure, I have provided a substantially U-shaped work rest 14 which is adapted to be positioned forwardly of the chuck 12. The work rest 14 is carried by the depending arm 15 of an L-shaped supporting member 16 and is vertically adjusted within a bore or socket 17 carried by the arm 15, by means of a set screw 18. Preferably the work rest 14 is formed with a shank 19 engaging in the socket 17, and the shank 19 is formed with spaced recesses 20 within a selected one of which the set screw 18 is adapted to engage.

The horizontal arm 21 of the L-shaped member 16 is disposed in a tubular bushing 22 which is carried by a split ring clamping member 23. The horizontal leg 21 is provided with spaced recesses or slots 24 within a selected one of which a set screw 25 threaded through the bushing 22, is adapted to engage. The clamping member 23 is clamped to the forward end of an endwise movable sleeve 26 of cylindrical configuration, which is movably mounted about a cylindrical housing 27.

As shown in Figure 1, a plurality of anti-friction balls 28 are carried by the housing 27 and engage the interior of the sleeve 26. A pair of anti-friction thrust members or bearings 29 and 30 are interposed between the housing 27 and the spindle 10, and each bearing has the inner race thereof fixed to the spindle 10, and the outer race thereof fixed to the housing 27.

The housing 27 has extending from the lower portion thereof a pair of L-shaped arms 31 between the forward ends of which a gear member 32 is rotatably mounted. The gear member 32 is secured to a shaft 33 which is journalled through the arms 31 and a lever or crank 34 is fixed to the outer end of the shaft 33. A longitudinally extending gear rack 35 is fixed by fastening means 36 to the housing 27 and is engaged by the gear 31.

Referring now to Figures 3 and 4, there is disclosed a modified form of this invention wherein an inverted U-shaped work rest 37 is carried by a substantially U-shaped arm 38 which is fixed to a clamping ring 39. The ring 39 is clamped to a cylindrical sleeve 40 which is movable endwise with respect to a cylindrical housing 41. Ball bearings 42 are interposed between the sleeve 40 and the housing 41, being carried by the housing 41.

A spindle 43 is disposed centrally through the housing 41, being rotatably mounted axially of the housing 41 by means of thrust bearings 44 and 45. The housing 41 has extending from the upper side thereof a pair of L-shaped arms 46, between the forward ends of which a gear 47 is rotatably mounted. The gear 47 is fixed to a shaft 48 which is journalled through the arms 46, and a lever or crank 49 is secured to the shaft 48. The gear 47 meshes with an elongated gear rack 50 which is secured by fastening means 51 to the upper side of the sleeve 40.

The spindle 43 has fixed on the inner or rear end thereof a threaded socket or bushing 52, and a conventional chuck 53 is mounted on the forward end of the spindle 43.

Referring now to Figure 5, there is disclosed another modification of this invention wherein the work rest generally designated as 54 is fixed to a supporting arm 55 by fastening means 56. A work piece W may be clamped to the arms of the U-shaped work rest 54 by fastening means 57.

In the use and operation of this device, the spindle 10 is threaded onto the threaded end of a drill press spindle formed as part of a hand drill which may be either manually or electrically operated. The work is engaged on the inner side of the work rest 14, and the lever or crank 43 may then be rocked rearwardly or to the left, causing movement of the rest 14 with the work toward the drill which is carried by the chuck 12. With an attachment of this kind the desired pressure may be applied between the work piece and the drill bit so that the bit will cut into the work piece in the desired manner. This attachment will provide a means whereby equalized pressure will be applied between the work piece and the drill bit which is in alignment with the spindle and the drill bit, thereby preventing any tilting of the drilling structure including the spindle and chuck during the drilling operation.

This attachment will provide a means whereby relatively small holes may be drilled into a relatively large work piece without moving the work piece to a stationary drill press and without orienting the work piece with respect to the drill press. This attachment with the drill structure, may be used either vertically, horizontally or at any angular position.

I do not mean to confine myself to the exact details of construction herein disclosed, but claim all variations falling within the purview of the appended claims.

What I claim is:

1. A drill attachment for detachably mounting on the threaded spindle of an electrically operated hand drill comprising a cylindrical housing, a spindle rotatably disposed through and supporting said housing, a threaded socket at one end of said second-named spindle for mounting on said first-named spindle, a chuck at the other end of said second-named spindle, a sleeve rotatably disposed about said housing, a work rest carried by said sleeve disposed in forwardly spaced relation with respect to said sleeve and said chuck, and correlated means carried partly by said sleeve and partly by said housing whereby said sleeve and housing may be moved endwise one relative to the other.

2. A drill attachment for detachably mounting on the threaded spindle of an electrically operated hand drill comprising a cylindrical housing, a spindle rotatably disposed through and supporting said housing, anti-friction bearings interposed in said housing and said second-named spindle holding said housing against endwise movement of said second-named spindle, a threaded socket at one end of said second-named spindle for mounting on said first-named spindle, a chuck at the other end of said second-named spindle, a sleeve rotatably disposed about said housing, a work rest, means supporting said work rest from said sleeve in a position forwardly of said chuck, and correlated means carried partly by said sleeve and partly by said housing whereby said sleeve and housing may be moved endwise one relative to the other.

DAVID N. GOLDBERG.

References Cited in the file of this patent

UNITED STATES PATENTS

| Number | Name | Date |
| --- | --- | --- |
| 1,623,747 | Nelson | Apr. 5, 1927 |
| 1,926,788 | Park et al. | Sept. 12, 1933 |